United States Patent
Nobuhara

(10) Patent No.: US 12,440,984 B2
(45) Date of Patent: Oct. 14, 2025

(54) OFFLINE TEACHING DEVICE AND MOTION-PROGRAM GENERATION METHOD

(71) Applicant: FANUC CORPORATION, Yamanashi (JP)

(72) Inventor: Atsushi Nobuhara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 220 days.

(21) Appl. No.: 17/915,224

(22) PCT Filed: May 20, 2021

(86) PCT No.: PCT/JP2021/019196
§ 371 (c)(1),
(2) Date: Sep. 28, 2022

(87) PCT Pub. No.: WO2021/241398
PCT Pub. Date: Dec. 2, 2021

(65) Prior Publication Data
US 2023/0125071 A1    Apr. 27, 2023

(30) Foreign Application Priority Data
May 25, 2020    (JP) .................. 2020-090262

(51) Int. Cl.
*B25J 9/00*    (2006.01)
*B25J 9/16*    (2006.01)
*G05B 19/425*    (2006.01)

(52) U.S. Cl.
CPC .......... *B25J 9/1666* (2013.01); *G05B 19/425* (2013.01); *G05B 2219/40317* (2013.01)

(58) Field of Classification Search
CPC ...... B25J 9/1664; B25J 9/1666; B25J 9/1671; B25J 9/163; B25J 9/1697; B25J 9/1605;
(Continued)

(56) References Cited

U.S. PATENT DOCUMENTS

| | | | |
|---|---|---|---|
| 2006/0052901 A1* | 3/2006 | Nihei | B25J 9/1674 700/245 |
| 2006/0184278 A1* | 8/2006 | Nihei | B25J 9/1664 700/245 |

(Continued)

FOREIGN PATENT DOCUMENTS

| | | |
|---|---|---|
| CA | 2713700 A1 | 2/2011 |
| EP | 3326566 A1 | 5/2018 |

(Continued)

OTHER PUBLICATIONS

International Search Report mailed Aug. 3, 2021 in corresponding International Application No. PCT/JP2021/019196; 6 pages (w/ partial Machine translation).

*Primary Examiner* — Truc M Do
(74) *Attorney, Agent, or Firm* — Maier & Maier, PLLC

(57) ABSTRACT

An offline teaching device for reducing an amount of time required to generate a motion route with which interference could be avoided, the offline teaching device including at least one processor. The processor generates, as a result of a motion program that includes a plurality of teaching points being input, numerous interpolation points on a motion route of a tool distal-end point of a robot, the motion route being formed among the teaching points in accordance with the motion program; and detects whether interference occurs between each of the generated interpolation points and a peripheral device.

5 Claims, 4 Drawing Sheets

(58) Field of Classification Search
CPC ...... B25J 9/1674; B25J 9/1676; B25J 9/1687;
B25J 13/08; B25J 9/0081; B25J 9/0084;
B25J 9/0087; B25J 9/1612; B25J 9/1633;
B25J 9/1653; B25J 9/1656; B25J 9/1669;
B25J 9/1682; B25J 9/1694
See application file for complete search history.

(56) References Cited

U.S. PATENT DOCUMENTS

| | | | | |
|---|---|---|---|---|
| 2007/0293962 | A1* | 12/2007 | Kimura | G05B 19/4103 |
| | | | | 700/182 |
| 2010/0217528 | A1 | 8/2010 | Sato et al. | |
| 2010/0292843 | A1* | 11/2010 | Kariyazaki | A61B 34/30 |
| | | | | 901/46 |
| 2011/0054685 | A1 | 3/2011 | Wada | |
| 2013/0116822 | A1* | 5/2013 | Atohira | B25J 9/1671 |
| | | | | 700/255 |
| 2015/0239121 | A1 | 8/2015 | Takeda | |
| 2017/0129100 | A1 | 5/2017 | Takeda | |
| 2018/0036882 | A1* | 2/2018 | Kimura | B25J 9/1664 |
| 2018/0193102 | A1 | 7/2018 | Inoue | |
| 2019/0240833 | A1* | 8/2019 | Kimura | B25J 9/1664 |
| 2019/0351550 | A1* | 11/2019 | Fujii | B25J 9/1666 |

FOREIGN PATENT DOCUMENTS

| | | |
|---|---|---|
| GB | 2473129 A | 3/2011 |
| JP | H09-212225 A | 8/1997 |
| JP | 2000-112510 A | 4/2000 |
| JP | 2011-048621 A | 3/2011 |
| JP | 2011-110630 A | 6/2011 |
| JP | 2015-066668 A | 4/2015 |
| JP | 2015-098076 A | 5/2015 |
| JP | 2015-160277 A | 9/2015 |
| JP | 5860081 B | 2/2016 |
| WO | 2010/004744 A1 | 1/2010 |
| WO | 2017/014303 A1 | 1/2017 |

* cited by examiner

OFFLINE TEACHING DEVICE AND MOTION-PROGRAM GENERATION METHOD

CROSS-REFERENCE TO RELATED APPLICATIONS

This application is a national phase of International Patent Application No. PCT/JP2021/019196, filed on May 20, 2021, which claims priority to Japanese Patent Application No. 2020-090262, filed on May 25, 2020, the entire contents of which is incorporated herein by reference

FIELD

The present disclosure relates to an offline teaching device and a motion program generation method.

BACKGROUND

There is a known simulation device that generates a motion route for a robot so that the robot can perform prescribed work while avoiding interference with a peripheral device (for example, see Publication of Japanese Patent No. 5860081). With the simulation device, whether interference occurs is detected by disposing 3D models of the robot and the peripheral device in the same virtual space, and, in the case in which interference occurs, an intermediate point with which the interference could be avoided is added between teaching points before and after the interference occurs.

SUMMARY

Solution to Problem

An aspect of the present disclosure is an offline teaching device comprising at least one processor, wherein the processor: generates, as a result of a motion program that includes a plurality of teaching points being input, numerous interpolation points on a motion route of a tool distal-end point of a robot, the motion route being formed among the teaching points in accordance with the motion program; and detects whether interference occurs between each of the generated interpolation points and a peripheral device.

DETAILED DESCRIPTION OF THE EMBODIMENTS

An offline teaching device 1 according to an embodiment of the present disclosure will be described below with reference to the drawings.

Figure 1:
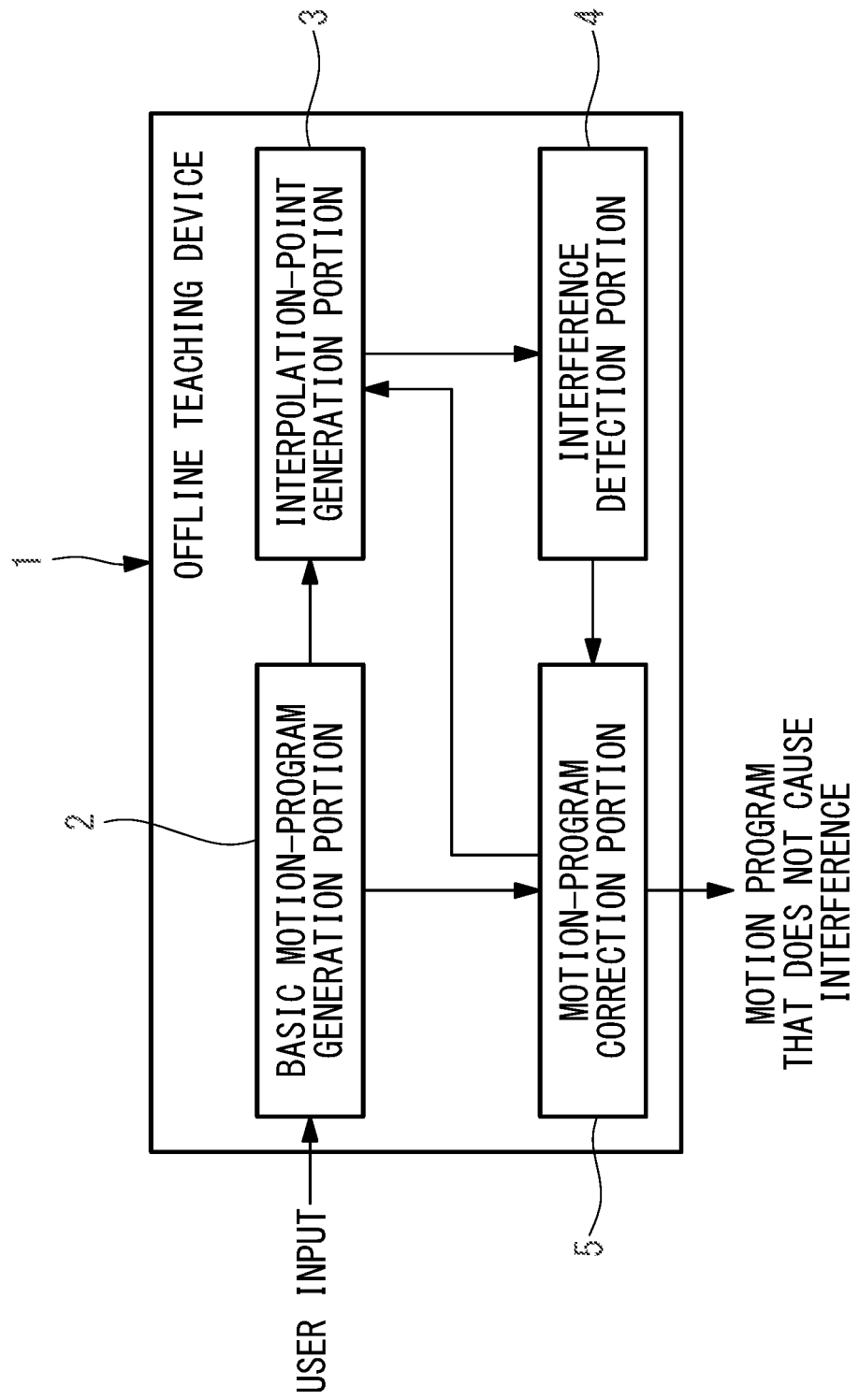
FIG. 1 is a block diagram showing an offline teaching device according to an embodiment of the present disclosure.

As shown in FIG. 1, the offline teaching device 1 according to this embodiment includes a basic motion-program generation portion 2, an interpolation-point generation portion 3, an interference detection portion 4, and a motion-program correction portion 5. Each of the basic motion-program generation portion 2, the interpolation-point generation portion 3, the interference detection portion 4, and the motion-program correction portion 5 includes at least one processor, a memory, and a monitor.

The basic motion-program generation portion 2 stores 3D models of a robot (see FIG. 2) 100, a peripheral device, a workpiece, and so forth that are disposed in the same virtual space. It is possible to generate a basic motion program by a user specifying teaching points while causing the 3D model of the robot 100 to execute a motion in the virtual space displayed on a monitor and inputting information about motion speed, acceleration, interpolation method, and so forth between the specified teaching points.

The interpolation-point generation portion 3 generates, in accordance with the information about the teaching points, the speed, the acceleration, the interpolation method, and so forth specified in the input motion program, a motion route on which a TCP (tool distal-end point) of the robot 100 moves when the robot 100 executes a motion in the virtual space. When doing so, points on the route, including the values that the respective axes of the robot 100 take at regular intervals, are determined. These points on the route serve as interpolation points. Therefore, numerous interpolation points are automatically generated when generating the route. The interpolation-point generation portion 3 outputs three-dimensional coordinate information of all of the generated interpolation points.

The interference detection portion 4 employs the coordinate information of the interpolation points output from the interpolation-point generation portion 3 to calculate three-dimensional coordinates of joint points of the robot 100 for when the TCP is disposed at each interpolation point.

Figure 2:
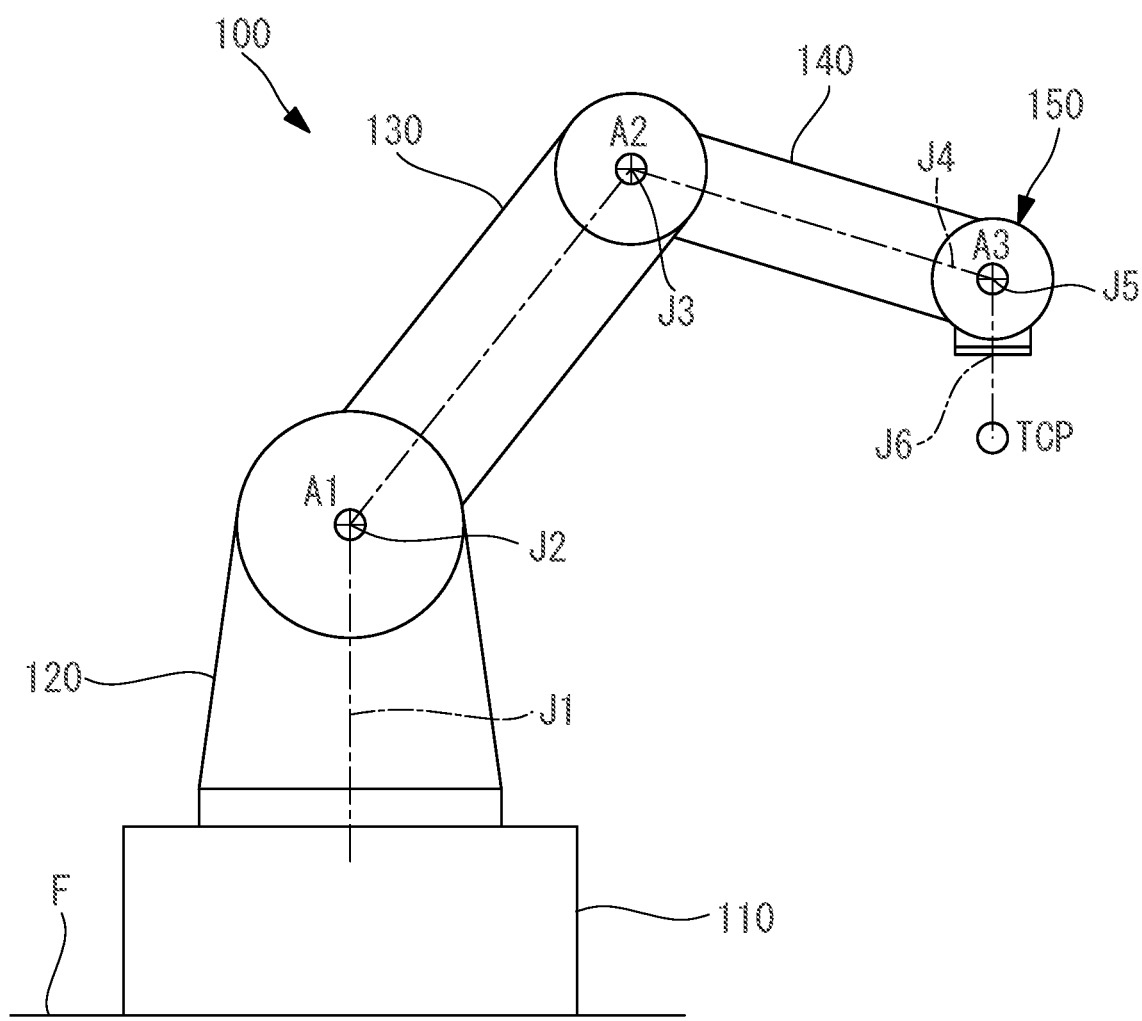
FIG. 2 is a diagram schematically showing an example of a robot for which a motion program is generated by means of the offline teaching device in FIG. 1.

The robot 100 is, for example, as shown in FIG. 2, a vertical six-axis articulated-type robot and includes: a base 110 installed on a floor surface F; and a rotating body 120 that is supported with respect to the base 110 so as to be rotatable about a vertical first axis J1. In addition, the robot 100 includes: a first arm 130 that is supported with respect to the rotating body so as to be pivotable about a horizontal second axis J2; and a second arm 140 that is supported with respect to the first arm 130 so as to be pivotable about a third axis J3 that is parallel to the second axis J2. Furthermore, the robot 100 includes a three-axis wrist unit 150 at a distal end of the second arm 140.

Examples of the joint points include, for example, as shown in FIG. 2, an intersection A1 between a plane that contains the first axis J1 and that is orthogonal to the second axis J2 and the second axis J2, an intersection A2 between said plane and the third axis J3, and an intersection A3 among the three axes of the wrist unit 150, namely, axes J4-J6.

The interference detection portion 4 detects whether interference occurs between the respective interpolation points (TCP) and the peripheral device, and also detects whether interference occurs between the respective joint points A1, A2, and A3 and the peripheral device.

When interference occurs at an interpolation point, the interference detection portion 4 outputs information about the teaching point immediately before or after said interpolation point. Here, the information about the teaching point may be, for example, the teaching point number.

Upon receiving the information about the teaching point before or after the interpolation point at which interference has occurred from the interference detection portion 4, the motion-program correction portion 5 generates, by means of a publicly known method, an intermediate point (intermediate teaching point) disposed between the teaching points before and after the interpolation point, at a position at which the interference with the peripheral device is avoided. Regarding information about the speed and acceleration for the motion until reaching the intermediate point from the immediately preceding teaching point, the information is set such that the motion is continued until reaching the immediately subsequent teaching point without decelerating between the immediately preceding teaching point and the intermediate point.

A motion program generation method for the thus-configured offline teaching device 1 according to this embodiment will be described below.

In order to generate a motion program by employing the offline teaching device 1 according to this embodiment, first, a user teaches teaching points in the basic motion-program generation portion 2. The teaching points are taught by the user specifying a plurality of teaching points for performing work on a workpiece displayed on a monitor by operating a 3D model of the robot 100 displayed on the monitor.

Figure 3:
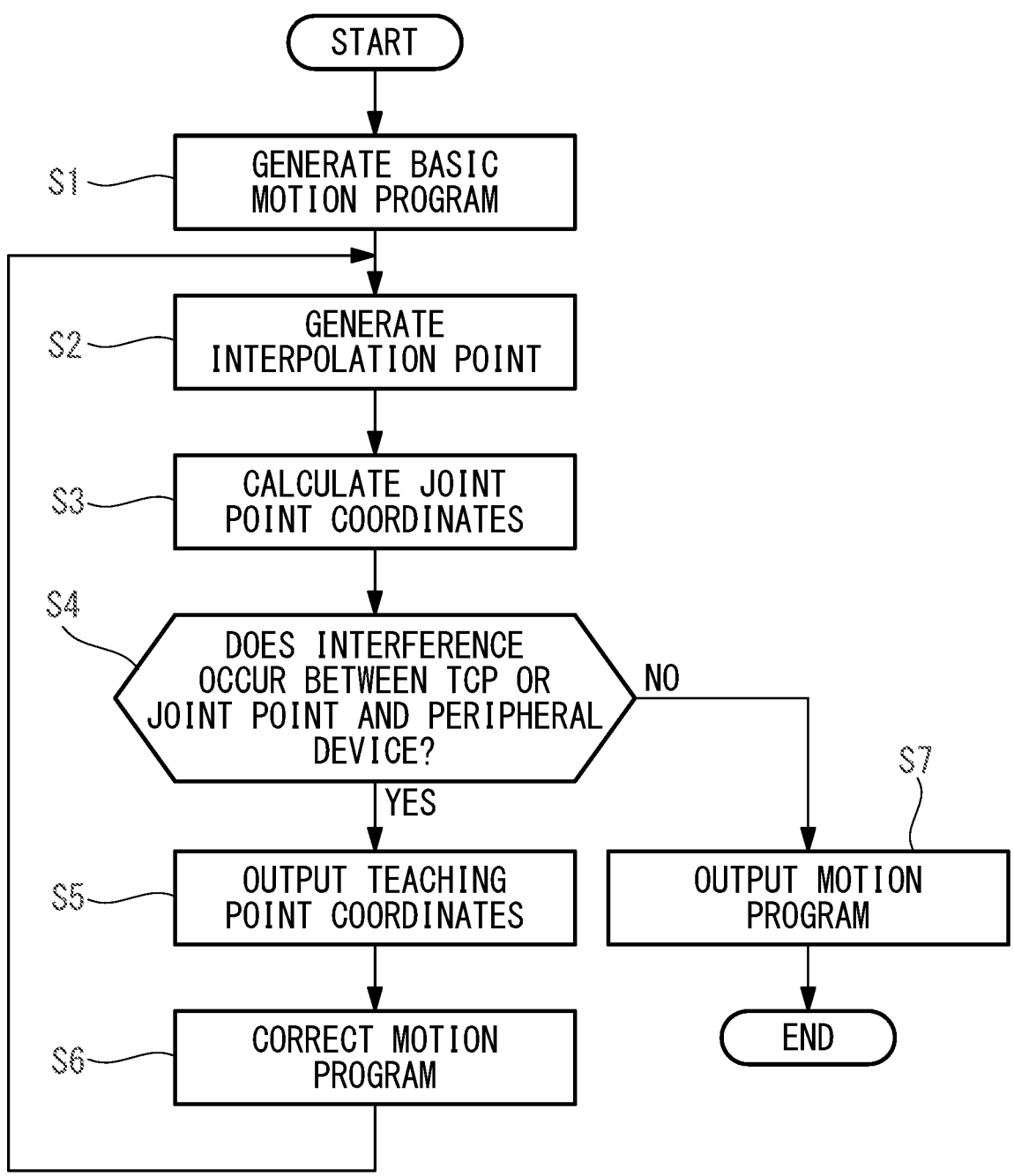
FIG. 3 is a flowchart showing a motion program generation method according to an embodiment of the present disclosure, employing the offline teaching device in FIG. 1.

In this case, the user specifies, for the basic motion program, the start point, the end point, and at least one teaching point between the start point and the end point, while avoiding interference between a peripheral device and the robot 100 displayed on the monitor. Furthermore, the user inputs information about the speed, the acceleration, the interpolation method, and so forth for defining the motion of the robot 100 between the respective teaching points. Accordingly, as shown in FIG. 3, the basic motion program is generated (step S1). Here, although a method in which the user himself/herself teaches interference avoidance to some extent has been described as a method for adding the teaching points, there is no limitation thereto. For example, the user may specify only the start point and the end point, and the teaching points for avoiding interference may automatically be added by means of a publicly known method.

The basic motion program generated in the basic motion-program generation portion 2 is transmitted to the interpolation-point generation portion 3, and the interpolation-point generation portion 3 calculates a motion route of a TCP among the respective teaching points and generates numerous interpolation points on the motion route (step S2).

The coordinates of the generated interpolation points are output to the interference detection portion 4.

Upon receiving the coordinates of the numerous interpolation points transmitted thereto from the interpolation-point generation portion 3, the interference detection portion 4 calculates coordinates of the joint points A1-A3 of the robot 100 for when the TCP is disposed at each interpolation point (step S3). In addition, the angles of the joint points A1-A3 have already been determined at the time of interpolation point calculation. The coordinates of the joint points A1-A3 may be calculated from the interpolation point coordinates and the information about the mechanism of the robot 100 by means of reverse transformation.

The interference detection portion 4 detects, from the coordinates of the respective interpolation points and the joint points A1-A3, whether interference is occurring between the TCP or any one of the joint points A1-A3 and the peripheral device (step S4).

In the case in which interference occurs between the TCP or any one of the joint points A1-A3 and the peripheral device, the interference detection portion 4 outputs information about at least one of two teaching points, immediately before and immediately after the interpolation point at which the interference has occurred (step S5).

The teaching point information output from the interference detection portion 4 is transmitted to the motion-program correction portion 5. In addition, the basic motion program is transmitted to the motion-program correction portion 5 from the basic motion-program generation portion 2.

The motion-program correction portion 5 corrects the motion program by generating, by means of a publicly known method, an intermediate point for avoiding interference with the peripheral device between the two teaching points sandwiching the interpolation point at which interference has occurred (step S6).

The corrected motion program is transmitted to the interpolation-point generation portion 3.

Then, steps from step S2 are repeated until it is confirmed in step S4 that interference does not occur at all of the interpolation points.

In the case in which interference is not detected in step S4, the final motion program is output (step S7), and processing ends.

As has been described above, with the offline teaching device 1 and the motion program generation method according to this embodiment, it is possible to roughly check for interference between the robot 100 and the peripheral device without having to execute the motion program. In other words, as a result of employing information about interpolation points that are normally generated in the motion plan of the robot 100 before executing a motion program, it is possible to generate a motion program with which interference does not occur between the TCP or any one of the joint points A1-A3 and the peripheral device without having to execute the motion program.

There is an advantage in that it is possible to considerably reduce the amount of time required to perform interference checks, as compared with a case in which interference checks are performed by employing the 3D model of the robot 100 for all of the interpolation points numerously generated on a motion route. In addition, in the case in which interference occurs, the addition of intermediate points, the generation of new interpolation points based on teaching points including the added intermediate points, and interference checks based on the generated interpolation points are repeated; therefore, it is possible to even more effectively reduce the required amount of time.

In addition, with this embodiment, a motion program with which it is possible to roughly avoid interference between the robot 100 and a peripheral device is generated. Although interference checks employing a 3D model of the robot 100 are required for detailed determination of whether interference occurs, with this embodiment, it is possible to considerably reduce the final number of times interference checks employing the 3D model are performed, and, as a result, it is possible to reduce the amount of time required to create a motion program.

Note that, with this embodiment, the basic motion-program generation portion 2 that generates a basic motion program is included; however, said component may be omitted and the basic motion program may be input after being separately created.

In addition, with this embodiment, whether interference occurs between the joint points A1-A3, which are calculated from the interpolation points, and a peripheral device is detected in addition to interference between the interpolation points and the peripheral device; however, only whether interference occurs between the interpolation points and the peripheral device may be detected.

Figure 4:
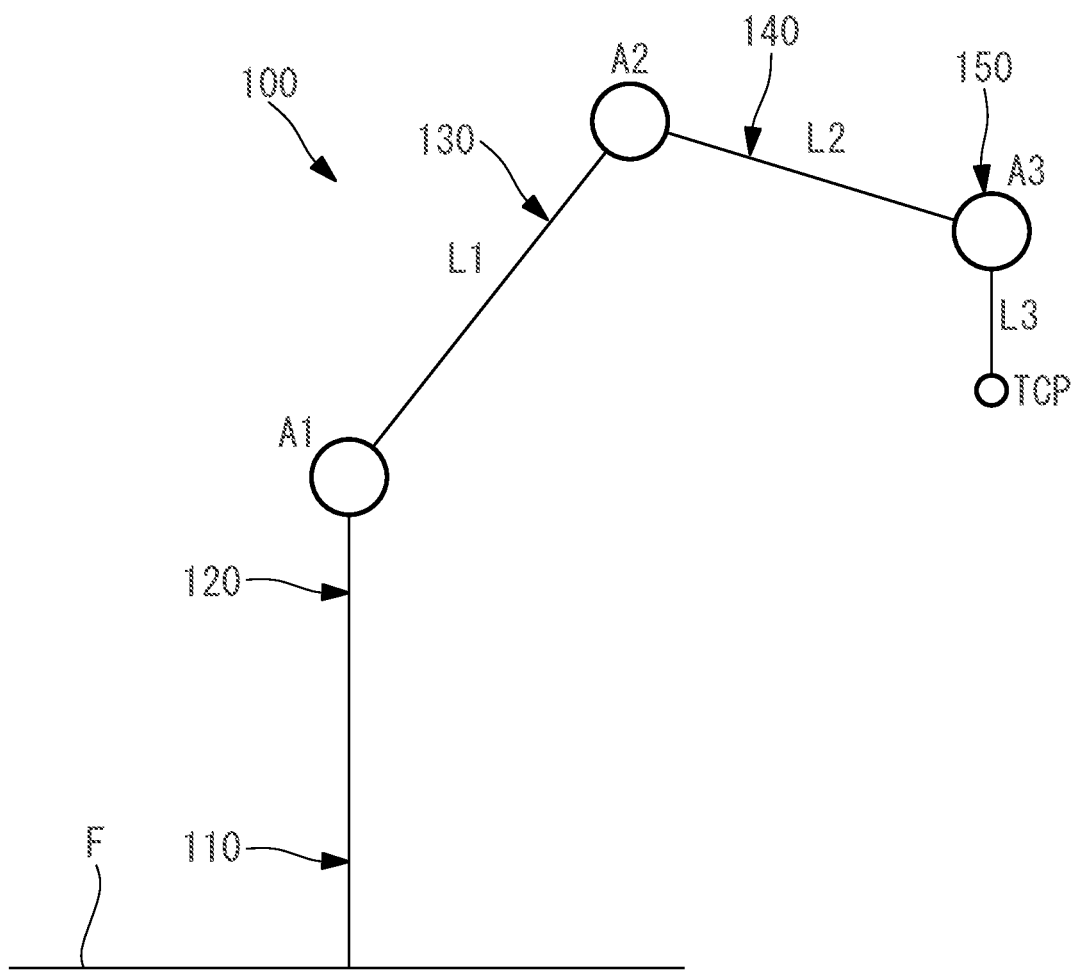
FIG. 4 is a schematic diagram for explaining a subject for which interference with respect to a peripheral device is detected by the offline teaching device in FIG. 1.

Furthermore, in addition to the joint points A1-A3, whether interference occurs between lines L1, L2, and L3 that connect the joint points A1-A3, as shown in FIG. 4, and the peripheral device may also be detected. By doing so, it is possible to perform an even more detailed check for interference between the robot 100 and a peripheral device, and it is possible to reduce the amount of time required for the detection by considerably reducing the amount of calculation, as compared with the case in which the 3D model of the robot 100 is employed.

The invention claimed is:

1. An offline teaching device comprising:
   at least one processor; and
   a memory storing a model of a robot and a model of a peripheral device that are disposed in a same virtual space, wherein
   the processor is configured to:
      receive information including a plurality of teaching points input by a user,
      generate a motion program based on the received information,
      generate numerous interpolation points automatically on a motion route of a tool distal-end point of the robot, the motion route formed among the teaching points in accordance with the generated motion program;
      calculate coordinates of one or more joint points of the robot when the tool distal-end point thereof is disposed at each of the generated interpolation points to determine a line segment connecting a joint point and either the adjacent joint point or the adjacent tool tip, and
      detect whether interference occurs between each of the generated interpolation points and the determined line segment and the peripheral device.

2. The offline teaching device according to claim 1, wherein, when interference is detected between the robot and the peripheral device at any one of the interpolation points, the processor is further configured to add an intermediate teaching point between the teaching points before and after the interpolation point, and perform the generation of the interpolation point and the detection of interference occurrence with respect to the motion program in which the intermediate teaching point has been added.

3. The offline teaching device according to claim 2, wherein the processor is further configured to:
   correct the intermediate teaching point or add an additional intermediate teaching point until no interference is detected at all of the interpolation points, and
   output the motion program that has reached a point where the interference is no longer detected as a final motion program.

4. A method for generating a motion program based on a model of a robot and a model of a peripheral device that are stored in a memory and are disposed in a same virtual space, the method comprising:
   receiving, by at least one processor, information including a plurality of teaching points input by a user;
   generating, by the at least one processor, a basic motion program based on the received information;
   generating numerous interpolation points automatically on a motion route of a tool distal-end point of the robot, the motion route being formed among the teaching points in accordance with the generated basic motion program;
   calculating coordinates of one or more joint points of the robot when the tool distal-end point thereof is disposed at each of the generated interpolation points to determine a line segment connecting a joint point and either the adjacent joint point or the adjacent tool tip, and
   detecting whether interference occurs between each of the generated interpolation points and the determined line segment and the peripheral device.

5. An offline teaching device comprising:
   at least one processor; and
   a memory storing a model of a robot and a model of a peripheral device that are disposed in a same virtual space, wherein
   the processor is configured to:
      receive information including a plurality of teaching points input by a user,
      generate a motion program based on the received information,
      generate numerous interpolation points automatically on a motion route of a tool distal-end point of the robot, the motion route formed among the teaching points in accordance with the generated motion program;
      calculate three-dimensional coordinates of one or more joint points of the robot when the tool distal-end point thereof is disposed at each of the generated interpolation points, and
      detect whether interference occurs between each of the generated interpolation points and the calculated joint points and the peripheral device.

* * * * *